Jan. 21, 1958  C. F. DAWES  2,820,607
PIPE PULLING DEVICE
Original Filed June 17, 1952
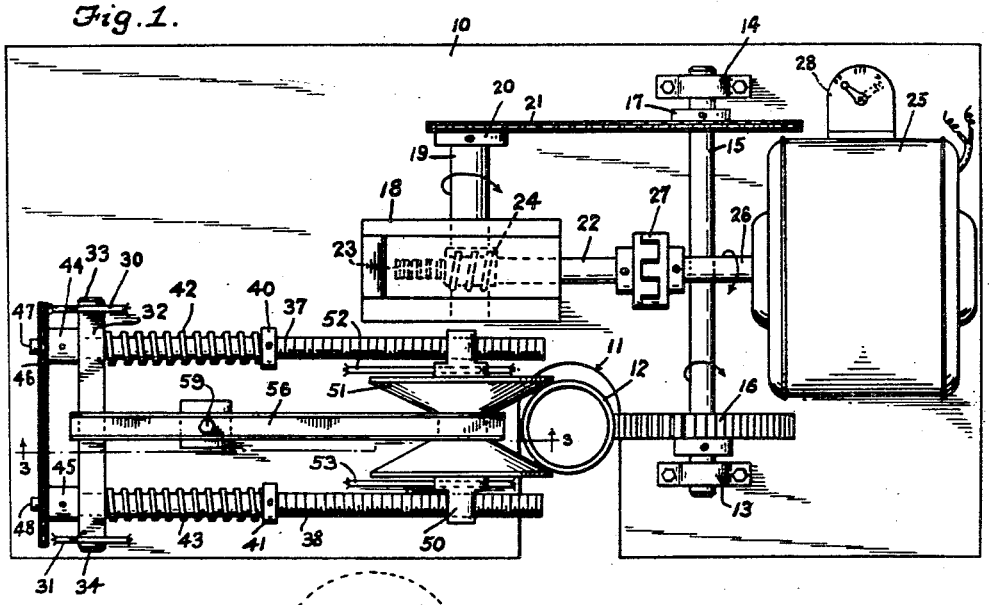
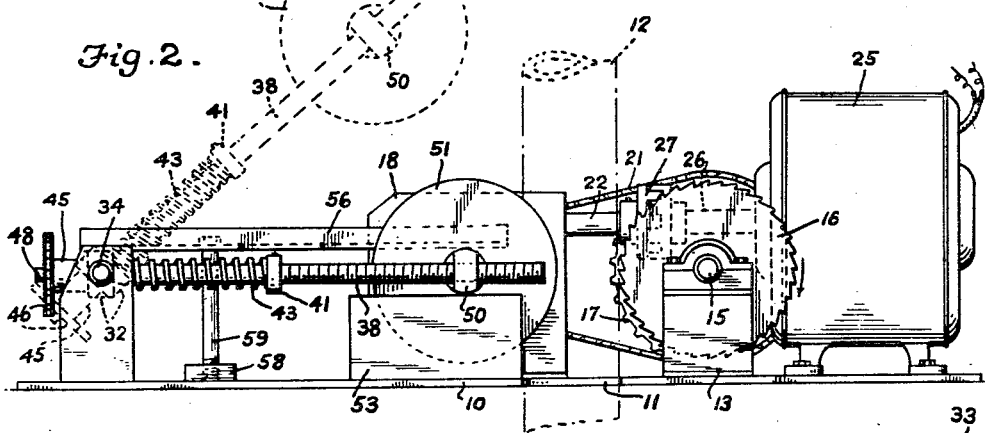
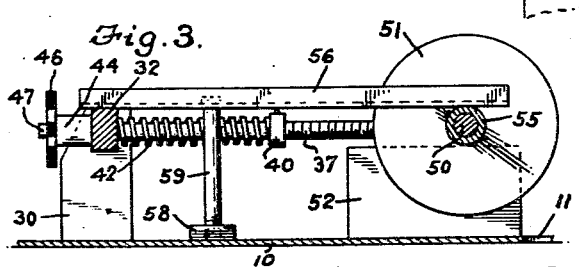
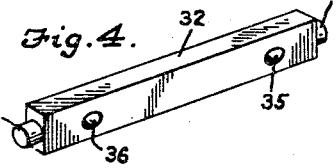
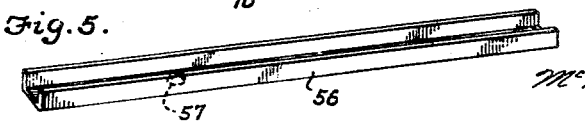
INVENTOR
CYRIL F. DAWES
BY
McMorrow, Berman + Davidson
Attorneys.

United States Patent Office 2,820,607
Patented Jan. 21, 1958

2,820,607

PIPE PULLING DEVICE

Cyril F. Dawes, Joplin, Mo.

Substituted for abandoned application Serial No. 294,101, June 17, 1952. This application August 24, 1956, Serial No. 605,991

3 Claims. (Cl. 254—30)

This invention relates to pipe pulling devices and more particularly to a motor driven device for raising well pipes from wells and lowering such pipes into associated wells.

It is among the objects of the invention to provide an improved pipe pulling device which can be conveniently mounted on the ground or on a platform at the head of a well and will engage a well pipe and raise the pipe from the well; which can be easily engaged with and released from a well pipe and resiliently engages the pipe so that coupling sleeves on the pipe can readily pass through the device; which can be stopped at any time while raising a pipe and will hold the pipe in the position of elevation to which the pipe has been brought; which can be used to lower a pipe into a well, as well as raise a pipe out of a well; and which is simple and durable in construction, economical to manufacture, easy to use, and positive and effective in operation.

Other objects and advantages will become apparent from a consideration of the following description and the appended claims in conjunction with the accompanying drawing wherein:

Figure 1 is a top plan view of a pipe pulling device illustrative of the invention;

Figure 2 is a side elevational view of the device illustrated in Figure 1;

Figure 3 is a fragmentary cross sectional view on the line 3—3 of Figure 1;

Figure 4 is a perspective view of a pivoted bar constituting an operative component of the device; and Figure 5 is a perspective view of a locking bar also constituting an operative component of the device.

With continued reference to the drawing, the device comprises a flat base 10 of rectangular shape adapted to be disposed on the ground or on the platform at the head of a well and having in one longitudinal edge thereof a notch 11 for receiving a pipe 12 to be raised out of or lowered into the well.

A bearing block 13 is mounted on the base adjacent one side of the notch 11 and a second bearing block 14 is mounted on the base at a location spaced transversely of the base from the bearing block 13 and near the edge of the base remote from the edge in which the notch 11 is provided. A shaft 15 is disposed above and extends transversely of the portion of the base between the bearing blocks 13 and 14 and is journaled at its ends in these bearing blocks. A peripherally toothed wheel 16 is mounted on the shaft 15 adjacent the bearing block 13 and extends over the adjacent edge of the notch 11. This wheel is positioned to engage the pipe 12 received in the notch 11 and has its teeth so shaped that the teeth in engagement with the pipe are upwardly inclined.

A chain sprocket 17 is mounted on the shaft 15 at a location spaced from the toothed wheel 16 and a transmission housing 18 is mounted on the base at a location spaced inwardly of the base from the inner end of the notch 11 and also spaced from the shaft 15. A shaft 19 extends through and is journaled in the housing 18 and projects from the housing in spaced and substantially parallel relationship to the shaft 15. A chain sprocket 20 is mounted on the shaft 19 in alignment with the chain sprocket 17 on the shaft 15 and a chain 21 drivingly connects the sprocket 20 to the sprocket 17.

A shaft 22 is journaled in the housing 18 above the shaft 19 and projects from the housing substantially at right angles to the shaft 19. A worm gear 23 is mounted on the shaft 19 within the housing 18 and a worm 24 is mounted on the shaft 22 and meshes with the worm gear 23, the pitch of the threads on the worm 24 being such as to provide an irreversible drive between the worm 24 and the worm gear 23.

An electric motor 25 is mounted on the base 10 at the side of the shaft 15 remote from the housing 18 and a motor shaft 26 is connected to the adjacent end of the shaft 22 by a flexible coupling 27 of well known construction. The motor 25 is a reversible motor and a motor controlling switch 28 is mounted on the motor and has an off position and forward and reverse positions at respectively opposite sides of the off position, as illustrated in Figure 1.

A pair of spaced apart, apertured lugs 30 and 31 are mounted on the base near the end of the base at the side of the notch 11 remote from the toothed wheel 16 and shaft 15 and near the edge of the base in which the notch 11 is provided. A bar 32 of rectangular cross sectional shape extends between the lugs 30 and 31 and has arbors 33 and 34 on its ends received in the apertures of the lugs 30 and 31 respectively to pivotally mount the bar on the lugs above the base 10. The bar has apertures 35 and 36 extending therethrough, one near each end thereof and screw shafts 37 and 38 are slidably received respectively in the apertures 35 and 36 of the bar 32. These screw shafts extend from the bar in spaced apart and substantially parallel relationship to each other toward the notch 11.

Spring abutment collars 40 and 41 are mounted on the screw shafts 37 and 38 respectively intermediate the length of these screw shafts and coiled compression springs 42 and 43 surround the screw shafts 37 and 38 respectively between the bar 32 and the corresponding spring abutment collars 40 and 41. Chain sprockets 44 and 45 are mounted on the shafts 37 and 38 respectively at the sides of the bar 32 remote from the notch 11 and the hub portions of these chain sprockets engage the adjacent side of the bar 32 to limit movement of the screw shafts 37 and 38 relative to the bar 32 by the springs 42 and 43. A chain 46 connects the sprockets 44 and 45 and formations 47 and 48 are provided on the screw shafts 37 and 38 at the ends of these shafts on which the chain sprockets 44 and 45 are mounted for engagement by a wrench or other suitable tool to simultaneously rotate both of the screw shafts.

An axle 50 is disposed at a location between the notch 11 and the bar 32 and adjacent the notch and this axle has screw threaded apertures one near each end thereof respectively receiving the screw shafts 37 and 38. A spool 51 is journaled on the axle 50 between the screw shafts 37 and 38 and abutment plates 52 and 53 are mounted in spaced apart relationship to each other on the base 10 adjacent the side of the notch 11 remote from the toothed wheel 16 and receive the axle 50 on their upper edges at respectively opposite sides of the spool 51.

The spool 51 has an annular, V-shaped notch therein and engages the pipe 12 at the side of the pipe remote from the toothed wheel 16 and in opposition to the toothed wheel. The pressure of the springs 42 and 43 acting against the spool 51 forces the spool against the pipe and the pipe against the toothed wheel with sufficient pressure to cause the teeth of the wheel to dig into the material of the pipe and provide a secure grip on the pipe for raising it out of or lowering it into a well. The pressure between the toothed wheel, the spool and the pipe can be regulated by rotating the shafts 37 and 38 to thread the axle 50 outwardly or inwardly along the shafts and consequently change the loading on the compression springs 42 and 43. At the center of the groove therein the spool 51 is provided with a cylindrical bearing portion 55 and a locking bar 56 rests near one end on the upper surface of the bar 32 and near its other end on the upper side of the bearing portion 55 of the spool 51. This locking bar has an aperture 57 intermediate its length and an internally screw threaded hollow boss 58 is provided on the base between the lugs 30 and 31 and the abutment plates 52 and 53. A bolt 59 extends through the aperture 57 and the bar 56 and is threaded into the screw threaded hollow boss 58 to hold the locking bar 56 down on the bearing surface 55 of the spool and the axle 50 down on the upper edges of the abutment plates 52 and 53. When the spool is held down by the locking bar 56 it is simultaneously held in engagement with the associated pipe 12 and forces the pipe against the teeth of the toothed wheel 16. When it is desired to remove the device from the pipe, the bolt 59 is removed from the boss 58 and the pulley 51 is raised, as indicated in broken lines in Figure 2, away from the pipe 12 thereby freeing the device from the pipe and permitting the device to be moved away from the location of the pipe.

With a pipe engaged between the toothed wheel 16 and the spool 51, if the motor 25 is driven in one direction the device will raise the pipe, and if the motor is driven in the opposite direction the device will lower the pipe. When the motor is stopped the pipe will be held at the elevation to which it has been brought by reason of the irreversible driving connection between the worm 14 and the worm gear 23 so that no brake is required to hold the pipe against movement when the device is stopped.

This application is a substitute of application Serial No. 294,101, filed June 17, 1952.

What is claimed is:

1. A pipe handling device comprising a flat base having a pipe receiving notch in one edge thereof, a shaft disposed above and extending transversely of said base adjacent one side of said notch, bearing blocks mounted on said base and rotatably supporting said shaft, a peripherally toothed wheel mounted on said shaft in position to engage a pipe received in said notch, a motor mounted on said base, means drivingly connecting said motor to said shaft and providing an irreversible driving connection between said motor and said shaft, a pair of spaced apart lugs mounted on said base at a location spaced from the side of said notch remote from said toothed wheel, a bar extending between and pivotally mounted at its ends in said lugs and having spaced apart apertures therein, screw shafts extending slidably one through each of said apertures and extending from said bar toward said notch in parallel relationship to each other, an axle having spaced apart and screw threaded apertures therein respectively receiving said screw shafts at a location spaced from said bar, a spool journaled on said axle between said screw shafts and having an annular groove therein, spring abutment means on said screw shafts intermediate the length thereof, spring means interposed between said bar and said spring abutment means resiliently urging said spool toward said toothed wheel, means interconnecting said screw shafts for simultaneous and coextensive rotation, abutment means mounted on said base adjacent said notch and receiving said axle to support said spool in engagement with a pipe disposed between said spool and said toothed wheel, and means releasably connected between said spool and said base holding said spool in operative position opposed to said toothed wheel.

2. A pipe handling device comprising a flat base having a pipe receiving recess therein, a shaft journaled on said base adjacent one side of said recess, a peripherally toothed wheel mounted on said shaft in position to engage a pipe received in said recess, a reversible motor mounted on said base, means providing an irreversible speed reducing driving connection between said motor and said shaft, a spool disposed at the side of said recess opposite said toothed wheel for engaging an associated pipe and holding the pipe against said wheel, means mounting said spool on said base for swinging movement of the spool toward and away from said toothed wheel, means on said base limiting swinging movement of said spool toward said wheel, and spring means resiliently urging said spool toward said wheel.

3. A pipe handling device comprising a flat base having a pipe receiving recess therein, a shaft journaled on said base adjacent one side of said recess, a peripherally toothed wheel mounted on said shaft in position to engage a pipe received in said recess, a reversible motor mounted on said base, means providing an irreversible speed reducing driving connection between said motor and said shaft, a spool disposed at the side of said recess opposite said toothed wheel for engaging an associated pipe and holding the pipe against said wheel, means mounting said spool on said base for swinging movement of the spool toward and away from said toothed wheel, means on said base limiting swinging movement of said spool toward said wheel, spring means resiliently urging said spool toward said wheel, and means releasably connecting said spool at its limiting position of swinging movement toward said wheel to said base.

References Cited in the file of this patent
UNITED STATES PATENTS

| | | |
|---|---|---|
| 598,527 | Michael | Feb. 8, 1898 |
| 1,064,073 | Hooker | June 10, 1913 |